United States Patent
Lambert et al.

(10) Patent No.: US 8,694,693 B2
(45) Date of Patent: Apr. 8, 2014

(54) METHODS AND SYSTEMS FOR PROVIDING USER SELECTION OF ASSOCIATIONS BETWEEN INFORMATION HANDLING RESOURCES AND INFORMATION HANDLING SYSTEMS IN AN INTEGRATED CHASSIS

(75) Inventors: Timothy M. Lambert, Austin, TX (US); Babu Chandrasekhar, Round Rock, TX (US); Michael A. Brundridge, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 13/443,105

(22) Filed: Apr. 10, 2012

(65) Prior Publication Data
US 2013/0268697 A1    Oct. 10, 2013

(51) Int. Cl.
*G06F 3/00*    (2006.01)
*G06F 13/12*    (2006.01)

(52) U.S. Cl.
USPC .............................................. 710/11; 710/62

(58) Field of Classification Search
None
See application file for complete search history.

(56) References Cited

U.S. PATENT DOCUMENTS

2008/0126627 A1*   5/2008   Chandrasekhar et al. ...... 710/62

* cited by examiner

*Primary Examiner* — Hyun Nam
(74) *Attorney, Agent, or Firm* — Jackson Walker L.L.P.

(57) ABSTRACT

In accordance embodiments of the present disclosure a method may include receiving a user indication of a desired association between at least one of a plurality of modular information handling systems and at least one or one or more information handling resources. The method may also include communicating one or more control signals to one or more switching elements housed in a chassis configured to house the plurality of modular information handling systems and the one or more information handling resources, such that a selected modular information handling system is communicatively coupled to a selected information handling resource in accordance with the user indication of the desired association.

20 Claims, 2 Drawing Sheets

METHODS AND SYSTEMS FOR PROVIDING USER SELECTION OF ASSOCIATIONS BETWEEN INFORMATION HANDLING RESOURCES AND INFORMATION HANDLING SYSTEMS IN AN INTEGRATED CHASSIS

TECHNICAL FIELD

The present disclosure relates in general to information handling systems, and more particularly to providing user selection of associations between information handling resources and information handling systems in an integrated chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output (I/O) resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with providing user selection of associations between information handling resources and information handling systems in an integrated chassis have been reduced or eliminated.

In accordance with embodiments of the present disclosure, a system may include a chassis, one or more information handling resources housed in the chassis, one or more chassis management controllers housed in the chassis, and selection logic communicatively coupled to the one or more chassis management controllers. The chassis may be configured to receive a plurality of modular information handling systems. The one or more chassis management controllers may be configured to be communicatively coupled to the one or more information handling systems, receive a user indication of a desired association between a selected modular information handling systems and a selected information handling resources, and communicate one or more output signals indicative of the user indication. The selection logic may be configured to, based on the one or more output signals, communicate control signals to one or more switching elements housed in the chassis such that the selected modular information handling system is communicatively coupled to the selected information handling resource in accordance with the user indication of the desired association.

In accordance with these and other embodiments of the present disclosure a method may include receiving a user indication of a desired association between at least one of a plurality of modular information handling systems and at least one or one or more information handling resources. The method may also include communicating one or more control signals to one or more switching elements housed in a chassis configured to house the plurality of modular information handling systems and the one or more information handling resources, such that a selected modular information handling system is communicatively coupled to a selected information handling resource in accordance with the user indication of the desired association.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
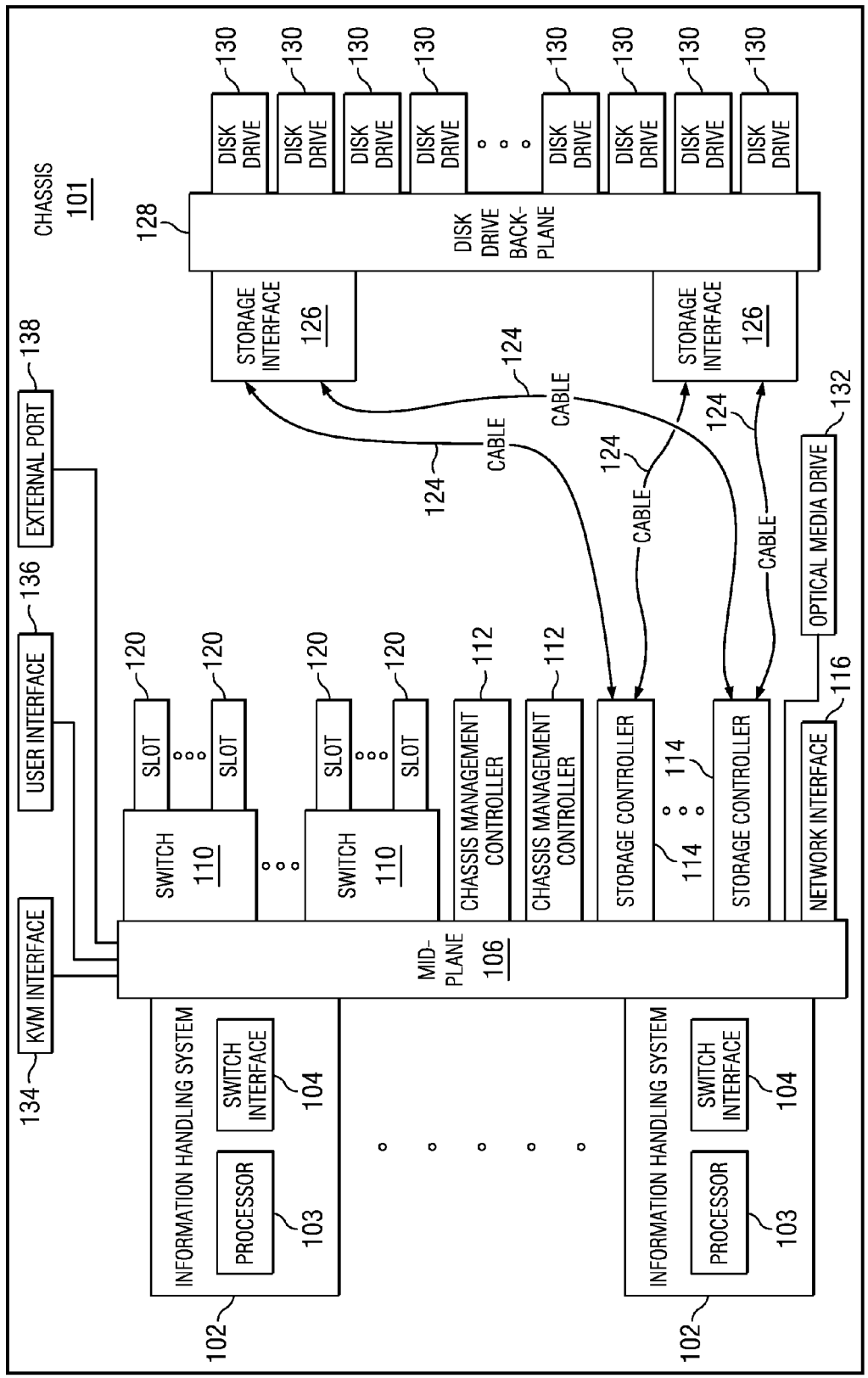
FIG. 1 illustrates a block diagram of an example system chassis with multiple information handling systems and with various peripheral and input/output capabilities common to the chassis as a whole, in accordance with certain embodiments of the present disclosure.
Figure 2:
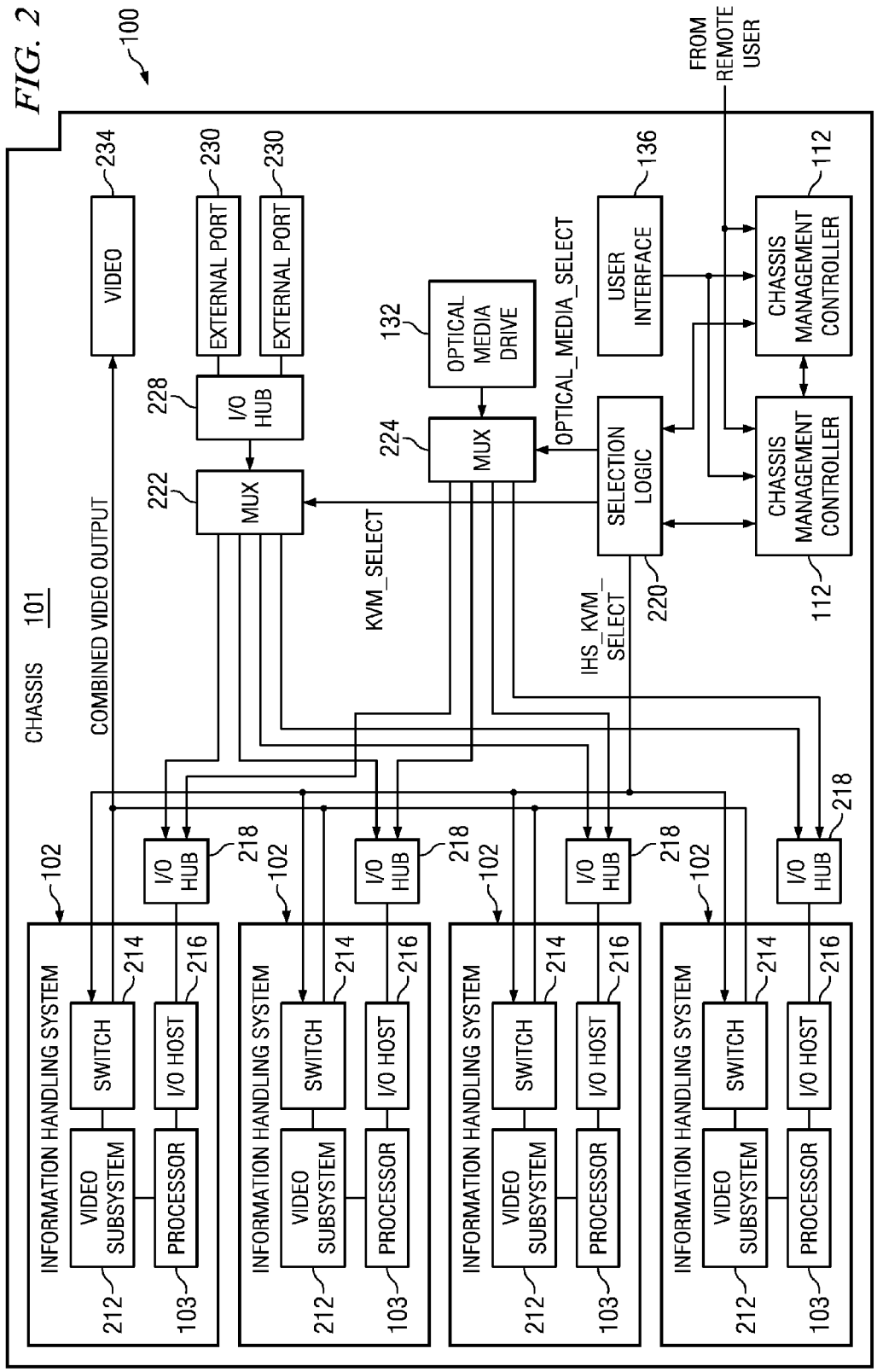
FIG. 2 illustrates a block diagram of selected components of the system depicted in FIG. 1, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse (KVM) interface 134, a user interface 136, and one or more external ports 138.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to the processor 103.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express (PCIe) switches, in which case a switch interface 104 may comprise a mezzanine card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Mid-plane 106 may comprise any system, device, or apparatus configured to interconnect modular information handling systems 102 with information handling resources of chassis 101. Accordingly, mid-plane 106 may include slots and/or connectors configured to receive information handling systems 102, switches 110, chassis management controllers 112, storage controllers 114, network interface 116, optical media drive 132, KVM interface 134, user interface 136, external port 138, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102.

A chassis management controller 112 may be any system, device, or apparatus configured to facilitate management and/or control of system 100, its information handling systems 102, and/or one or more of its component information handling resources. A chassis management controller 102 may be configured to issue commands and/or other signals to manage and/or control information handling system 102 and/or information handling resources of system 100. A chassis management controller 112 may comprise a microprocessor, microcontroller, digital signal processor (DSP), application specific integrated circuit (ASIC), field programmable gate array (FPGA), erasable programmable read-only memory (EPROM), or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface (IPMI) or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output (I/O) routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, a switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such manner). Accordingly, a full-height riser may itself physically couple with a low-profile to mid-plane 106, a switch 110, or another components, and full-height cards may then be coupled to full-height slots of full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card (NIC). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network (LAN) on motherboard (LOM) interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, external port 138 and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI (SAS) expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, optomagnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc (CD), digital versatile disc (DVD), blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display (LCD), cathode ray tube (CRT), a plasma screen, and/or a digital light processor (DLP) projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

An external port 138 may be communicatively coupled to mid-plane 106 and may comprise any system, device, and apparatus configured to receive an external device and electrically couple such external device to mid-plane 106 and/or mechanically couple such external device to chassis 101. For example, in some embodiments, an external port 138 may comprise a Universal Serial Bus (USB) port having a connector configured to receive a corresponding connector of a USB device. In these and other embodiments, an external port 138 may comprise any other type of suitable external port (e.g., Serial Advanced Technology Attachment (SATA), serial port, parallel port, etc.)

FIG. 2 illustrates a block diagram of selected components of the system depicted in FIG. 1, in accordance with certain embodiments of the present disclosure. In particular, FIG. 2 depicts an example architecture for providing user selection of associations between information handling resources (e.g., video interface 234, external ports 230, optical media drive 132, and/or other information handling resources).

As shown in FIG. 2, an information handling system 102 may comprise, in addition to or in lieu of those elements described in FIG. 1, a video subsystem 212, a switch 214, and an I/O host 216. Video subsystem 212 may include any system, device, or apparatus configured to generate images for display to a display device, and may include without limitation a graphics card, graphics accelerator, and/or other information handling resources suitable for image generation and/or output.

A switch 214 may be any system, device, or apparatus configured to, based on a received control signal (e.g., signal IHS_KVM_SELECT depicted in FIG. 2) selectively transmit signals to a video bus (e.g., as shown by the phrase "COMBINED VIDEO OUTPUT" in FIG. 2). An input/output (I/O) host 216 may comprise any system, device, or apparatus configured to act as an interface between its associated information handling system 102 and one or more information handling resources coupled to the I/O host 216. In some embodiments, an I/O host 216 may comprise a Universal Serial Bus (USB) host.

As shown in FIG. 2, chassis 101 may comprise, in addition to or in lieu of those elements described in FIG. 1, one or more I/O hubs 218, 228, selection logic 220, multiplexers 222, 224, video interface 234, and external ports 230.

Each I/O hub 218 may be associated with a respective information handling system 102. In particular, an I/O hub 218 may serve to combine signals received from multiplexer 222 and multiplexer 224 onto a single I/O bus. An I/O hub 218 may include any system, device, or apparatus that expands a single I/O port into a plurality of I/O ports such that there are additional ports available to couple information handling resources to a host system (e.g., an information handling system 102). In some embodiments, an I/O hub 218 may be implemented as a USB hub.

I/O hub 228 may include any system, device, or apparatus that expands a single I/O port into a plurality of I/O ports such that there are additional ports available to couple information handling resources to a host system (e.g., an information handling system 102). In particular, I/O hub 228 may serve to combine signals received from external ports 230 onto a single I/O bus. In some embodiments, I/O hub 228 may be implemented as a USB hub. In these and other embodiments, I/O hub 228 may have functionality and/or structure similar to that of I/O hub 218.

Video interface 234 may interface with a display device, as is known in the art. In some embodiments, video interface may be an integral component of a KVM interface (e.g., KVM interface 134).

An external port 230 may comprise any system, device, and apparatus configured to receive an external device and electrically couple such external device to information handling resources of chassis 101 and/or mechanically couple such external device to chassis 101. An external port 230 may be similar in structure and/or functionality to external port 138 depicted in FIG. 1. In addition or alternatively, an external port 230 may implement a keyboard interface or mouse interface of a KVM interface, and thus may be an integral component of a KVM interface (e.g., KVM interface 134).

Selection logic 220 may comprise any system, device, or apparatus configured to, based on input control signals received from one or more of chassis management controllers 212, generate control signals (e.g., signals KVM_SELECT and OPTICAL_MEDIA_SELECT shown in FIG. 2) for one or more of switches 214, multiplexer 222 and multiplexer 224, as described in greater detail below. In some embodiments, selection logic 220 may comprise a complex programmable logic device (CPLD).

A multiplexer 222, 224 may include any system, device, or apparatus that, based on a received control signal (e.g., signals KVM_SELECT and OPTICAL_MEDIA_SELECT shown in FIG. 2) selects one of several output signal lines or busses and forwards an input as an output onto the output signal line or bus, as described in greater detail below.

In operation, a user local to system 100 may interface with user interface 136 or a remote user may interface via a remote management console with a chassis management controller 112 to select associations between information handling systems 102 and other information handling resources (e.g., video interface 234, external ports 230, optical media drive 132, and/or other information handling resources). For example, a user may desire to associate video interface 234 with a particular information handling system 102 and may manifest such desire by providing appropriate input via user interface 136 and/or via remote management console with a chassis management controller 112. As another example, a user may desire to associate to optical media player 132 with a particular information handling system 102 and may manifest such desire by providing appropriate input via user interface 136 and/or via a remote management console interfaced to chassis management controller 112. As a further example, a user may desire to associated an external port 230 with a particular information handling system 102 and may manifest such desire by providing appropriate input via user interface 136 and/or via a remote management console interfaced to chassis management controller 112.

A chassis management controller 112 may receive one or more signals from user interface and/or a remote management console indicative of user desire relating to association between information handling system 102 and other information handling resources and, based on such signals, may communicate to selection logic 220 signals indicative of such desired associations. In response, selection logic 220 may generate and communicate control signals (e.g., KVM_SELECT, OPTICAL_MEDIA_SELECT, IHS_KVM_SELECT) in order to "focus" or associate the various information handling system 102 and information handling resources in accordance with the user's desire. For example, selection logic 220 may output a control signal (e.g., IHS_KVM_SELECT) to switches 214 of information handling systems 102 and, based on the signal, one of switches 214 may transmit output video signals from its associated video subsystem 212 to a video bus (e.g., COMBINED VIDEO OUTPUT in FIG. 2), while other switches 214 may remain "open" such that the video output of their associated video subsystems do not affect the video bus. Accordingly, video output generated by a user-selected information handling system 102 will be displayed to a display device coupled to video interface 234. As another example, selection logic 220 may generate and output a control signal (e.g., KVM_SELECT) to multiplexer 222 such that multiplexer 222 outputs combined data (e.g., keyboard and mouse data where external ports 230 are integral to a KVM interface) received from external ports 230 onto an output bus associated with the user-selected information handling system 102. As an additional example, selection logic 220 may generate and output a control signal (e.g., OPTICAL_MEDIA_SELECT) such that input/output communications may take place between optical media drive 132 and the information handling system 102 selected to be associated with optical media drive 132.

In embodiments in which I/O hosts 216 are implemented using USB hosts, switching associations of information handling resources with an information handling system 202 may cause a USB attach/detach event to occur.

In some embodiments, selection logic 220 may also be configured to communicate to chassis management controller 112 status information regarding the then-current associations between information handling systems 102 and information handling resources of chassis 101. Accordingly, a user may be able to view information regarding associations via a remote management console and/or user interface 136. In addition, in the event of a failover from one chassis management controller 112 to another, such status information may be maintained, such that associations are maintained after failover.

As shown in FIG. 2, various information handling resources may be independently associated with different information handling systems 102. For example, video interface 234, optical media drive 132, and the combination of external ports 230, may each be associated with different information handling systems 102 or the same information handling system 102 based on user preference.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a chassis constructed to receive a plurality of modular information handling systems;
   a plurality of information handling resources housed in the chassis, each of the plurality of information handling resources available for selective and independent association with one of the modular information handling systems;
   a chassis management controller to:
      receive a user indication of an association between a first modular information handling system selected from the plurality of modular information handling systems and a first information handling resource selected from the plurality of information handling resources; and
      generate an output signal indicative of the user indication; and
   selection logic to:
      receive the output signal from the chassis management controller;
      based on the user indication, output control signals to a switching element housed in the chassis, wherein the switching element couples the first modular information handling system to the first information handling resource,
   wherein the plurality of information handling resources include:
      an input/output port of an input/output hub that expands a single input/output port into a plurality of input/output ports.

2. The system of claim 1, wherein the chassis management controller receives the user indication from at least one of: a network interface; and a local interface housed in the chassis.

3. The system of claim 1, wherein the switching element comprises at least one of: a switch; and a multiplexer, and wherein the input/output hub is included with the chassis.

4. The system of claim 1, wherein the input/output port is an external Universal Serial Bus port.

5. The system of claim 1, wherein the plurality of information handling resources includes an optical media drive.

6. The system of claim 1, wherein the selection logic is to:
   communicate, to the chassis management controller, status information regarding the association between the first modular information handling system and the first information handling resource; and
   enable a user to access the status information.

7. The system of claim 6, wherein, when a failover occurs from the chassis management controller to a new chassis management controller, the chassis management controller is to:
   maintain the status information for the new chassis management controller, wherein the new chassis management controller maintains the association.

8. A method comprising:
   receiving, at a chassis management controller of an integrated chassis, a user indication of an association between a blade server and an information handling resource, wherein the blade server and the information handling resource are included in the integrated chassis; and
   responsive to receiving the user indication, outputting, by the chassis management controller, a control signal to a switching element included in the integrated chassis, wherein the switching element communicatively couples the blade server and the information handling resource,
   wherein the information handling resource is one of a plurality of information handling resources included in the chassis and available for selective and individual communicative coupling to the blade server, the plurality of information handling resources including:
      an input/output port of an input/output hub that expands a single input/output port into a plurality of input/output ports.

9. The method of claim 8, wherein the chassis management controller receives the user indication from at least one of: a network interface; and a local interface in the integrated chassis.

10. The method of claim 8, wherein the input/output port is an external Universal Serial Bus port.

11. The method of claim 8, wherein the plurality of information handling resources includes an optical media drive.

12. The method of claim 8, further comprising:
   communicating, to the chassis management controller, status information regarding a communicative coupling between the blade server and the information handling resource; and
   enabling a user to access the status information.

13. The method of claim 12, further comprising:
   when a failover occurs from the chassis management controller to a new chassis management controller, maintaining the status information for the new chassis management controller, wherein the new chassis management controller maintains the communicative coupling.

14. An integrated chassis in which a plurality of blade servers operate, the integrated chassis comprising:
   a plurality of information handling resources operating within the integrated chassis, each of the plurality of information handling resources available for selective and independent association with one of the plurality of blade servers;
   a chassis management controller to:
      receive a user indication of an association between a first blade server selected from the plurality of blade servers and a first information handling resource selected from the plurality of information handling resources; and
      generate an output signal indicative of the user indication; and
   selection logic to:
      receive the output signal from the chassis management controller;

based on the user indication, output control signals to a switching element housed in the integrated chassis, wherein the switching element couples the first blade server to the first information handling resource,
wherein the plurality of information handling resources include:
    an input/output port of an input/output hub that expands a single input/output port into a plurality of input/output ports.

15. The integrated chassis of claim 14, wherein the chassis management controller receives the user indication from at least one of: a network interface; and a local interface housed in the integrated chassis.

16. The integrated chassis of claim 14, wherein the switching element comprises at least one of: a switch; and a multiplexer, and wherein the input/output hub is included with the integrated chassis.

17. The integrated chassis of claim 14, wherein the input/output port is an external Universal Serial Bus port.

18. The integrated chassis of claim 14, wherein the plurality of information handling resources includes an optical media drive.

19. The integrated chassis of claim 14, wherein the selection logic is to:
    communicate, to the chassis management controller, status information regarding the association between the first blade server and the first information handling resource; and
    enable a user to access the status information.

20. The integrated chassis of claim 19, wherein, when a failover occurs from the chassis management controller to a new chassis management controller, the chassis management controller is to:
    maintain the status information for the new chassis management controller, wherein the new chassis management controller maintains the association.

* * * * *